INVENTOR.
PETER JOHN CARPENTER
AND JOHN HOWARD BRETT

United States Patent Office 3,428,991
Patented Feb. 25, 1969

3,428,991
DRIVE MECHANISM FOR ACTUATING A WINDSCREEN WASHER PUMP FROM A WINDSCREEN WIPER MOTOR
Peter John Carpenter, Dandenong, Victoria, and John Howard Brett, Mt. Eliza, Victoria, Australia, assignors to Trico Products Corporation, Buffalo, N.Y., a corporation of New York
Filed Mar. 2, 1967, Ser. No. 620,063
Claims priority, application Australia, Mar. 4, 1966, 2,466/66
U.S. Cl. 15—250.02                                9 Claims
Int. Cl. B60s 1/46; B05b 1/10

ABSTRACT OF THE DISCLOSURE

A pump and pump drive assembly actuated by the output of a rotary windshield wiper motor for producing a predetermined number of intermittent pump strokes after which the motor output is disengaged from the drive. A Geneva wheel is utilized to count the strokes and to drive a cam wheel and cam wheel follower which in turn actuates the pump. A solenoid energized at will positions a cam actuated lever to initiate pump operation by moving the Geneva wheel into engagement with the motor output.

Background of the invention

The invention relates to a drive mechanism for actuating a windshield washer pump from a windshield wiper motor and, more particularly, to a drive mechanism for intermittently driving a washer pump for a predetermined number of strokes after which the pump operation automatically ceases, but which operation can be repeated indefinitely.

Windshield washer drive mechanism of this type have been disclosed in the prior art, but are complex and require an excessive number of parts. Furthermore, the prior art mechanisms place a load on the motor even when the pump is inoperative because certain parts remain in engagement even though idling with respect to the pump. The additional load requires a larger motor than is necessary for its primary duty of operating the windshield wipers. Since the washer is operated only for brief intervals, it is uneconomical to utilize the prior art devices which call for larger motors. An example of a prior art device of this type is illustrated in Patent No. 2,953,802 by E. R. Ziegler, issued Sept. 27, 1960.

Summary

The present invention provides a unique drive mechanism utilizing a Geneva movement for counting the predetermined number of washer pump strokes and for driving the pump. The Geneva wheel is driven directly by a cam on the output shaft of the wiper motor and when the pump is in its inoperative condition, the wiper motor output shaft is out of engagement with the Geneva wheel. The drive mechanism eliminates a counting device separate from the drive mechanism and intermediate gearing between the output shaft, the counting mechanism and the drive mechanism.

There is also provided clutching between the Geneva wheel and the pump to avoid damage due to over-loading which may occur through a blockage by freezing or otherwise in the washer pump system. Secured to the motor shaft and rotatable therewith is a cam member having pins thereon which engage with the Geneva wheel to intermittently rotate the Geneva wheel. The perimeter of the Geneva wheel or star-wheel is provided with a gap so that no engagement between the cam member and the Geneva wheel occurs when the pump is not in operation. The Geneva wheel is in turn engaged with a cam wheel which drives a cam follower and oscillating lever. The lever drives an impulse type pump. Initiation of washer operation is obtained by a solenoid device energized at the will of the operator. The solenoid device positions a rocker arm for engagement with a motor driven cam member. The solenoid releases the rocker arm which in turn is moved by the cam member to rotate the Geneva wheel a distance sufficient to initiate engagement of the pins on the cam member with notches in the star-wheel. The lever is then cammed to an inoperative position until the solenoid is reenergized.

The principal object of the present invention is to provide a simple, economical drive mechanism which is drivable from the output shaft of a wiper motor for intermittently driving at the will of the operator a washer pump for a predetermined number of strokes.

Other objects and advantages of the invention will be apparent from the following detailed description taken in connection with the accompanying drawings.

Brief description of the drawings

FIG. 6 is an exploded perspective view of the star wheel and cam wheel of the drive mechanism.
FIG. 7 is a perspective view of a snap-on device for retaining certain parts assembled on a shaft.
FIG. 8 is a fragmentary view of the end of a shaft with the snap-on connector partly in position.
FIG. 9 is a sectional view partly in elevation taken on line IX—IX of FIG. 2.
FIG. 10 is a sectional view taken on line X—X of FIG. 9.
FIG. 11 is a partial sectional view taken on line XI—XI of FIG. 2.

Description of the preferred embodiments

Figure 1:
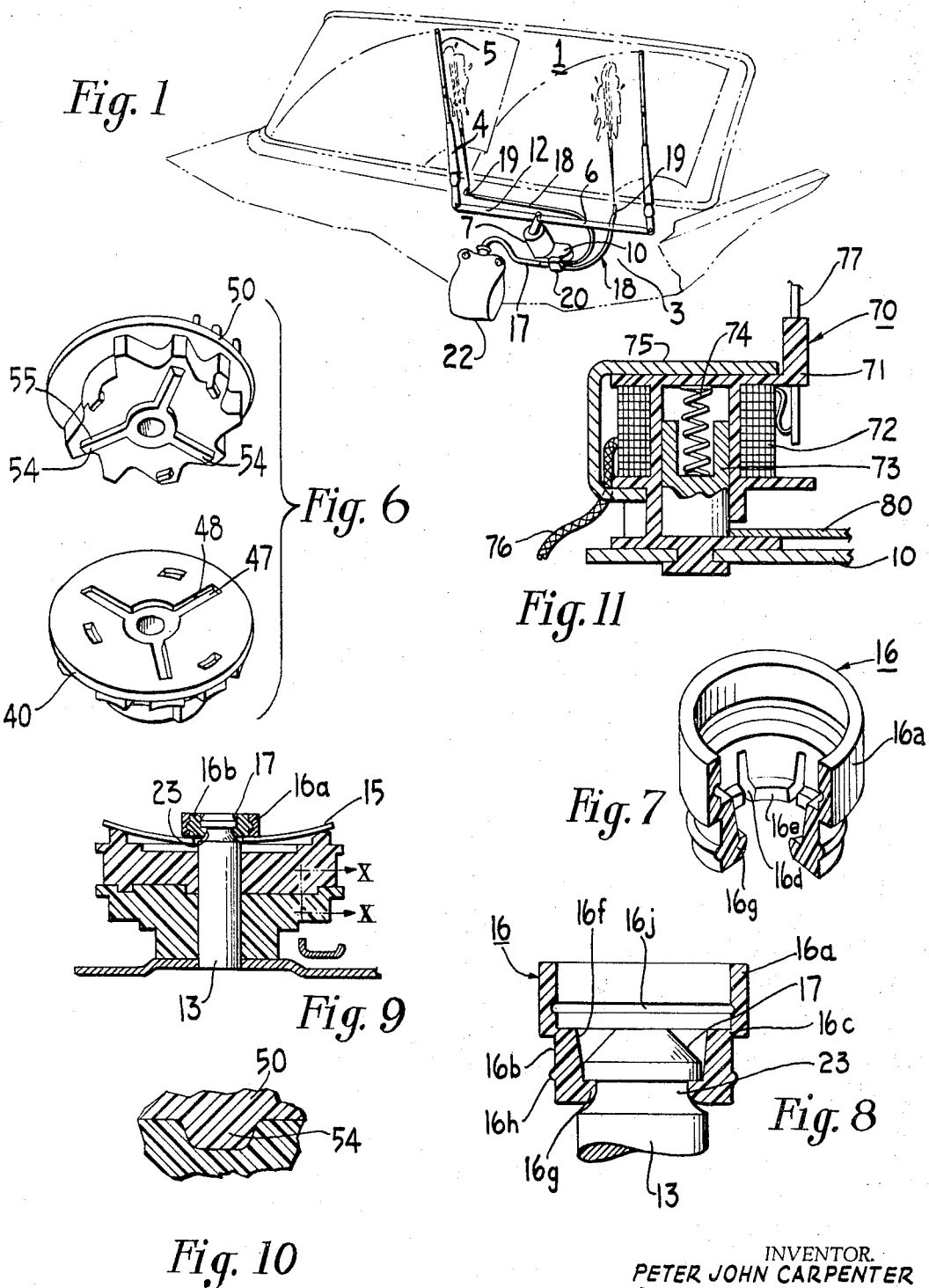
FIG. 1 is a fragmentary perspective view of a vehicle having the windshield cleaning system of this invention.

Referring to the drawings, FIG. 1 is a fragmentary view of a vehicle having a windshield 1, a cowl 2 and a fire wall 3. In accordance with conventional practice, the vehicle is equipped with a pair of windshield wipers including arms 4 and blades 5 which are oscillatable through linkage 6 during energization of wiper motor 7 through linkage 12 as shown. Secured to the wiper motor 7 is a bracket 10 carrying the pump drive mechanism and pump 20 secured thereto. A reservoir 22 for washer solvent is provided with a conduit 17 leading to the pump inlet and a pair of conduits 18 emanating from the pump outlets. The conduits 18 are connected at their free ends to nozzles 19 which are in turn directed toward the wiping path on the windshield 1.

Referring now to the drawings, FIGS. 2 through 5, the drive mechanism is assembled on the base plate 10 which also includes the pump 20 on bracket 11.

The first rotatable element and the counting wheel are constituted, respectively, by the cam member 30 and star-wheel 40 of a Geneva movement, whereby the cam member 30, driven by the output shaft, indicated at 9, of the wiper motor 7 rotates the star-wheel 40.

However, the star-wheel 40 at one location on its perimeter is provided with a gap 41 of such extend that, when juxtaposed the cam member 30, the latter is free to rotate without further driving the star-wheel, thereby discontinuing the driving engagement of the star-wheel by the cam member after substantially one revolution of the star-wheel.

The cam member 30 is rotatably mounted on base plate 10 and rotates continually when the windshield wiper is operating. The star-wheel 40 is rotatably mounted upon pin 13 fixed in the base plate 10.

Attached to the star-wheel, and rotatable concentrically therewith, is the cam wheel 50 profiled by a plurality of cams 51 composed of substantially identical ramps 52 interspaced by notches 53. The number of such ramps in the example illustrated is eight, but may be any convenient number predetermined to correspond with the number of pump strokes required in any one revolution of the star-wheel.

A cam follower, in the form of an oscillating lever 60, pivotally mounted on pin 14 fixed in base plate 10, operates the washer pump 20 responsive to rotation of the cam wheel 50. Also mounted on base plate 10 is a solenoid 70, which triggers a latch or rocker 80, pivoted upon the pin 14 and disposed below the lever 60 and cam member 30.

To initiate rotation of the star-wheel 40 (and thus the cam wheel 50) there is a projection 42 on a central boss 43 of the star-wheel, the solenoid-operated rocker 80 having a resilient arm 81 which normally can spring over the projection 42 when the star-wheel is rotating.

As best seen in FIG. 11, the solenoid 70 comprises a bobbin 71, made of dielectric material, which supports a coil 72. Within the bobbin and partly within the coil is a pole piece 73, biased in an extended position (as shown) by an axial spring 74. The whole is mounted in a yoke 75 and securely fixed to the base plate 10. A lead 76 connects the coil 72 to battery through a manually controlled switch (not shown) while earth terminal 77 connects to frame.

The rocker 80 is furnished with an upstanding flange 82 located in the region of the Geneva cam member 30, normally cleared by said cam member, but brought into the path of the cams 32 when the rocker 80 is operated by the solenoid 70. This is effected by a tension spring 83 which biases the rocker 80 in a clockwise direction (as seen in FIGS. 2 to 5). An operating end 84 of the rocker is normally restrained in an inoperative position by the movable pole piece 73 of the solenoid 70. Actuation of the solenoid lifts the pole piece 73 against the return spring 74, thereby releasing the rocker 80 to respond to spring 83.

Figure 3:
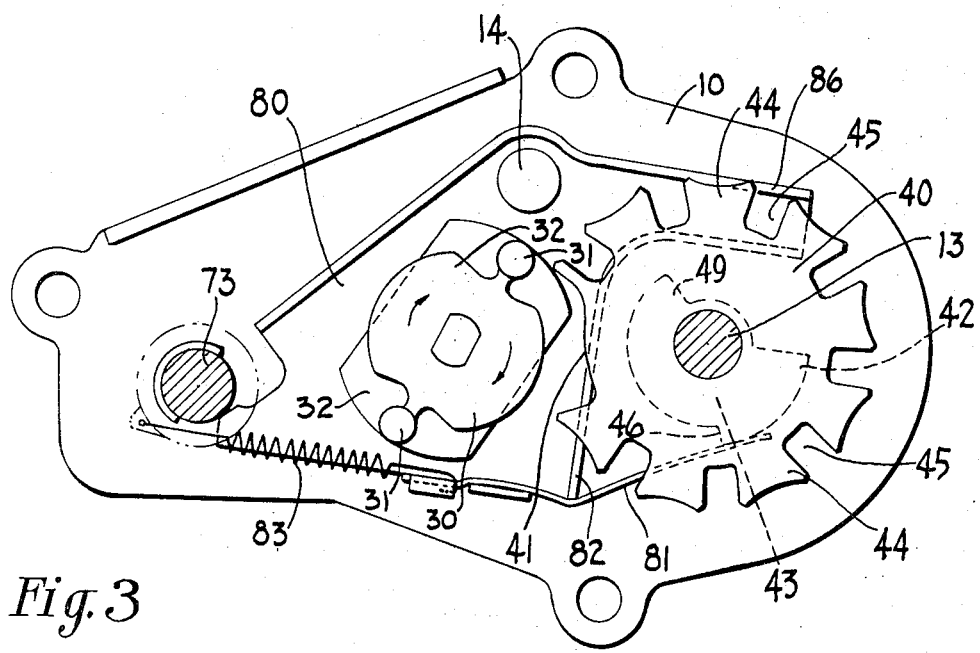
FIG. 3 is a top elevational view of the drive mechanism of this invention in its dormant position with certain parts removed for clarity.
Figure 4:
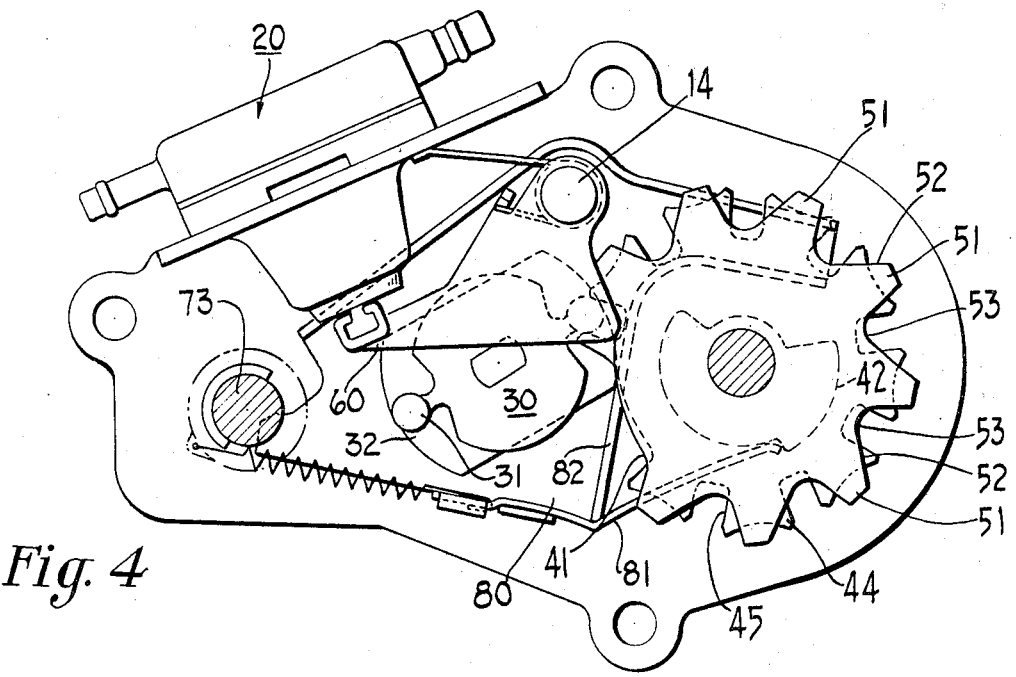
FIG. 4 is a top elevational view of the drive mechanism of this invention illustrating the position of the parts immediately after energization.
Figure 5:
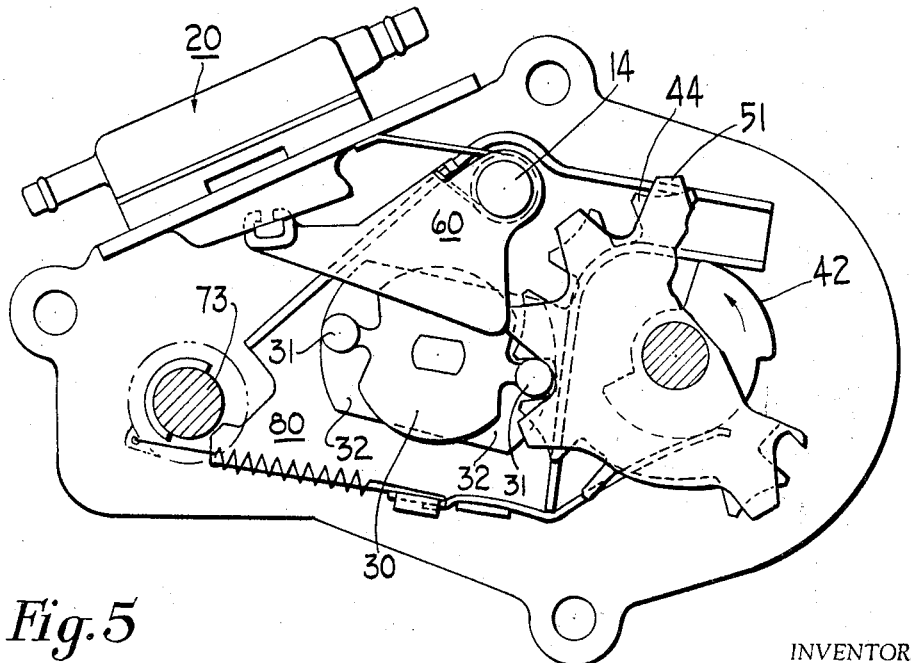
FIG. 5 is a view similar to FIG. 4 illusrating the position of the parts during operation of the pump.

Referring particularly to FIGS. 3 to 5, it will be seen that the cam member 30 is furnished with two upper pinlike cams 31, which cooperate with the star-wheel 40 to produce the Geneva movement, and two lower cams 32. It is the lower cams 32 which, upon operation of the solenoid 70, contact the flange 82 and cause the rocker 80 to rock upon pivot pin 14.

Figure 2:
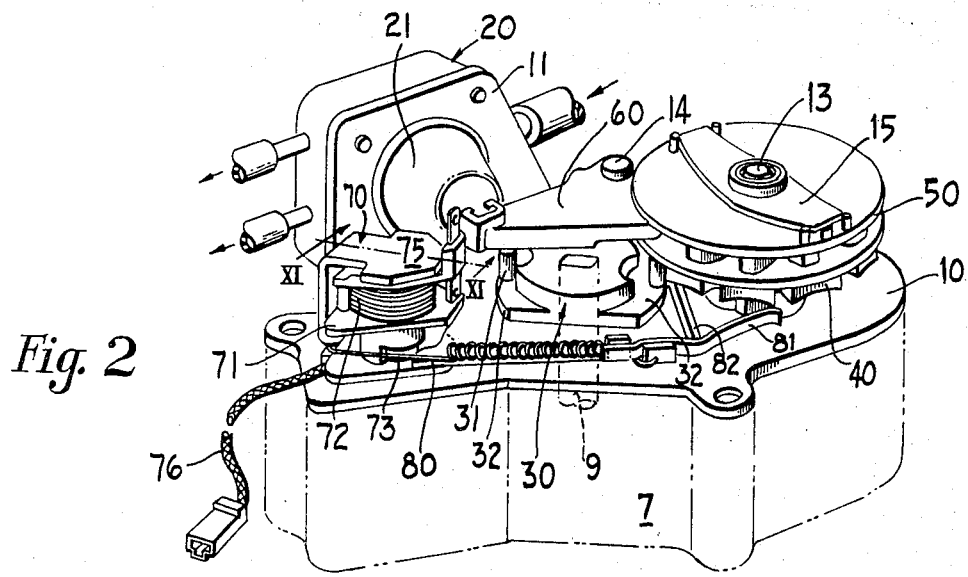
FIG. 2 is a perspective view of the drive mechanism and pump of the invention.

Details of the star-wheel 40 are shown in FIGS. 2, 3 and 6 and include the customary stars 44 interposed by radial driving channels 45 which are engaged by the upper pinlike cams 31 of the cam member 30. The gap 41 provides discontinuance of the drive by the cam member after substantially one revolution of the star-wheel. The number of stars 44 is the same as, and correlated with, the number of cams 51 on the cam wheel 50.

Upon momentary energization of the solenoid, the rocker 80 is rocked by spring 83 so that the resilient rocker arm 81 is moved past the projection 42 on the star-wheel boss 43 and then moves inwardly to abut and press against the shoulder 46 of projection 42 and so produce a turning movement of the boss 43 when one of the cams 32 acting upon the rocker 80 through said flange 82 returns the rocker to its original, inoperative position. This action intiates rotation of the star-wheel 40 through a small arc sufficient to drivingly engage the cam member 30 with the star-wheel 40 (FIG. 4), resulting in one revolution of the latter and consequently a predetermined number of strokes of the washer pump 20.

However, it is arranged that this initiating action of the rocker 80 by the cams 32 does not free the operating end 84 of the rocker completely from the pole piece 73 of the solenoid 70. The rocker is returned fully to its original, inoperative position (FIGS. 3 and 5) by the star-wheel boss 43 acting upon a rigid arm 86 of the rocker 80 as the star-wheel rotates through one revolution.

In this fully inoperative position, there is appreciable clearance between the flange 82 and the cams 32 so that, even if one of the cams 32 is opposite the flange 82 when the solenoid is energized, the operating end 84 of the rocker will move partly under the pole piece 73 and upon further rotation of the cam member 30, the rocker will continue its clockwise movement to bring the resilient arm 81 into operating position relative to the projection 42 of the boss 43 (FIG. 4) in readiness to respond to the other of said cams 32 acting upon the flange 82 as aforesaid.

At the conclusion of one revolution, the gap 41 in the star-wheel 40 will register with the cam member 30 (FIG. 3), and the star-wheel will cease to rotate until the solenoid is again energized.

Preferably the arrangement is such that the star-wheel 40 makes one revolhtion for four revolutions of the cam member 30, which is driven by the wiper motor. In the example illustrated, the cam wheel 50 has eight ramps 52 and therefore causes the pump 20 to make eight strokes for eight sweeps (4 cycles) of the wiper blades. The drive relationship between the motor and the pump is phased so as to cause the jets of water from the windshield washer to fall on the glass and not on the wiper blades.

It will be plain from the foregoing that upon completion of the eight pump strokes and consequent eight jets of water, the washer will automatically cease while the wiper blades may continue to function. Repeated washer operation can be initiated by energizing the solenoid through a switch at a control point convenient to the driver.

To provide against over-loading of the mechanism in the event of a pump blockage or other obstruction, a safety device may be incorporated in the drive. In the example illustrated this is disposed between the star-wheel 40 and the cam wheel 50, and takes the form of a slipping clutch. In this slipping clutch arrangement the star-wheel and the cam wheel are spring biased towards each other by a spring plate 15, secured on pin 13 by retaining means 16, the underface of cam wheel 50 being provided with radial projections 54, and the upper face of star-wheel 40 having corresponding radial depressions 47. Driving engagement between the projections 54 and the depressions 47 is through lateral sloping faces 55 and 48, respectively, on each so that, if and when overloading occurs in the drive from the star-wheel to the cam wheel, the two wheels can separate by overcoming the bias of spring plate 15 and the drive is thereby interrupted.

When the over-load conditions no longer exist, the projections and depressions will reengage to restore the required inter-relationship. To ensure that this inter-relationship does not get out of phase, the projections and depressions are angularly staggered so that they can only re-engage in the correlated angular position.

The spring plate 15 produces at all times an axially directed stress upon the star-wheel 40 (through the cam wheel 50) pressing it against the base plate 10, thereby serving to steady the star-wheel against accidental turning movement when in the stationary position.

A further safeguard in this respect is provided by a step 49 in the star-wheel boss 43 cooperating with a rigid arm 86 of the rocker 80 to ensure that the projection 42 and shoulder 46 on the star-wheel boss are correctly located relative to the resilient rocker arm 81 when the rocker is in the operating position.

The washer pump 20 employed in the above example may be of any suitable pattern, but preferably is of the kind conventionally used in this type of device and comprises a rubber bulb 21 which is compressed and extended by the cam follower oscillating lever 60.

The mode of securing the spring plate 15 on the pin 13 may be by any convenient means, but (as shown in FIGS. 7, 8 and 9) is preferably in the form of a snap-on device 16 specially designed and constructed for rapid assembly of the spring plate 15, neatness when installed, and providing absolute security.

The pin 13 is provided with a chamfered edge 17 and an adjacent annular groove 18 designed to cooperate with the device 16.

The device 16 is preferably made of a suitable plastic, such as celcon acetal coplymer, having a degree of resiliency, but capable of clean sheer separation. It is composed of two portions, moulded or otherwise made integrally; an upper collar 16a and a lower skirt 16b. The inside diameter of the collar 16a is substantially the same as the outside diameter of the skirt 16b, and the portions are joined together by a thin web 16c. The skirt 16b is split axially at a number of equidistant circumferential places by slits 16d, which extend towards and preferably as far as the web 16c, providing resilient prongs 16e.

The main bore 16f of the skirt 16b is substantially the same diameter as the pin 13 over the end of which the device fits, but there are on the prongs inwardly extending claws 16g designed to match the annular groove 18 of the pin 13.

Upon applying the device 16 to the end of pin 13, downward pressure on the collar 16a will cause the prongs 16e to spread outwardly until the claws 16g pass over the end of the pin and then snap into the groove 18.

Further axial pressure, such as a sharp downward blow on the collar 16a will cause the thin web 16c to shear and the collar to proceed downwards until it completely surrounds the skirt 16b and securely locks the prongs 16e in position with the claws 16g keyed into the groove 23 (FIG. 9).

As a further security measure, the prongs 16e may have circumferentially disposed external ridges 16h, and the collar 16a may have an internal annular recess 16j located so as to register with the ridges 16h when the collar is in the final position surrounding the skirt 16b.

There is sufficient resilience in the plastic material of the device to allow the collar 16a to ride over the ridges 16h until they register with the recess 16j. By the same token, the collar 16a can be withdrawn from the skirt 16b, and the latter removed, to enable dismantling of the mechanism, if and when required.

What is claimed is:

1. A drive mechanism for actuating a windshield washer pump from a windshield wiper motor, comprising a first rotatable element driven by the wiper motor, a rotatable counting wheel intermittently drivable by said first rotatable element, means operated by said counting wheel for actuating the washer pump a predetermined number of pump strokes for one revolution of said counting wheel, a servo device, a lever member operated by said servo device for positioning, upon energization of the device at will, the said lever member so that the lever member is acted upon by said first rotatable element to initiate movement of said counting wheel into driving engagement with said first rotatable element, thereby rotating said counting wheel, and means discontinuing said driving engagement of said counting wheel by said rotatable element upon completion of substantially one revolution of said counting wheel.

2. A mechanism according to claim 1 wherein the first rotatable element and the counting wheel comprise, respectively, a cam member and a star-wheel of a Geneva movement, and the means for discontinuing the driving engagement of the star-wheel by the cam member is a gap on the perimeter of the star-wheel.

3. A mechanism according to claim 2 wherein the star-wheel comprises a cam wheel profiled by a plurality of cams, and the means for actuating the washer pump is a cam follower associated with said cams and in the form of an oscillating lever.

4. A mechanism according to claim 3 wherein the cam wheel is attached to the star-wheel and rotatable concentrically therewith through a slipping clutch device.

5. A mechanism according to claim 4 wherein the servo device is a solenoid and the lever operated by said solenoid is a rocker pivotally mounted and spring biased to rock in one direction, upon energization of the solenoid at will, so as to position a flange on said rocker in the path of a cam on the cam member, whereby the rocker is acted upon by said cam to rock in the reverse direction thus restoring the rocker to its original inoperative position and simultaneously causing an arm of the rocker to initiate movement of the star-wheel by rotating the star-wheel through a small arc sufficient to drivingly engage it with the cam member.

6. A mechanism according to claim 4 wherein the star-wheel and the cam wheel are spring biased towards each other and the slipping clutch device is located between the upper face of the star-wheel and the underface of the cam wheel, said slipping clutch device comprising projections on one said face and corresponding depressions on the other said face providing slippable driving means between the star-wheel and the cam wheel through lateral sloping faces, respectively, on said projections and depressions.

7. A mechanism according to claim 5 wherein the arm of the rocker that initiates movement of the star-wheel is a resilient arm arranged to ride over a projection on a central boss on the star-wheel when the rocker is rocked in said one direction, and abut and press against a shoulder of said projection when the rocker is rocked in said reverse direction, thereby partially rotating the star-wheel.

8. A mechanism according to claim 6 wherein the projections and depressions are angularly staggered so that they can reengage only in one correlated angular position.

9. A mechanism according to claim 6 wherein the star-wheel and the cam wheel are mounted for rotation upon a common fixed pin, the spring bias being provided by a diametrically disposed spring plate having a center hole passed over the said pin and resiliently bearing at its ends upon the cam wheel, the spring plate being retained in stressed condition upon the pin by retaining means adapted to engage an external annular groove near the end of the pin.

References Cited

UNITED STATES PATENTS

| | | | |
|---|---|---|---|
| 2,953,802 | 9/1960 | Ziegler | 15—250.02 |
| 2,965,913 | 12/1960 | Ziegler | 15—250.02 |
| 3,095,596 | 7/1963 | Oishei et al. | 15—250.02 |
| 3,259,069 | 7/1966 | Rogakos | 15—250.02 XR |

PETER FELDMAN, Primary Examiner.

U.S. Cl. X.R.

103—23